United States Patent

Huang

[11] Patent Number: 5,775,718
[45] Date of Patent: Jul. 7, 1998

[54] FOLDING ASSEMBLY FOR A TROLLEY

[76] Inventor: Li-chu Chen Huang, No. 99, Fuchou 7th St., Chiayi City, Taiwan

[21] Appl. No.: 633,646
[22] Filed: Apr. 17, 1996
[51] Int. Cl.[6] ........................................ B62B 7/06
[52] U.S. Cl. ............................ 280/642; 280/647
[58] Field of Search ...................... 280/639, 38, 641, 280/642, 647, 650, 657, 658, 47.24, 47.27, 47.28, 47.29

[56] References Cited

U.S. PATENT DOCUMENTS

| 4,887,834 | 12/1989 | Cabagnero | 280/642 |
| 5,447,323 | 9/1995 | Huang | 280/642 |
| 5,454,584 | 10/1995 | Haut et al. | 280/642 |
| 5,460,398 | 10/1995 | Huang | 280/642 |
| 5,524,503 | 6/1996 | Ishikura | 280/642 |
| 5,535,483 | 7/1996 | Cabagnero | 280/642 |
| 5,536,033 | 7/1996 | Hinkston | 280/642 |
| 5,622,377 | 4/1997 | Shamie | 280/642 |
| 5,645,293 | 7/1997 | Cheng | 280/642 |

FOREIGN PATENT DOCUMENTS

| 3830752 | 3/1990 | Germany | 280/642 |

Primary Examiner—Karen M. Young
Assistant Examiner—Douglas Hess
Attorney, Agent, or Firm—Sixbey, Friedman, Leedom & Ferguson, PC; Stuart J. Friedman

[57] ABSTRACT

A trolley folding assembly includes a driving device and a driven device. A person is able to fold the whole trolley with only one hand by first pressing a safety switch and then pulling a driving rod received within a link of the driving device.

3 Claims, 7 Drawing Sheets

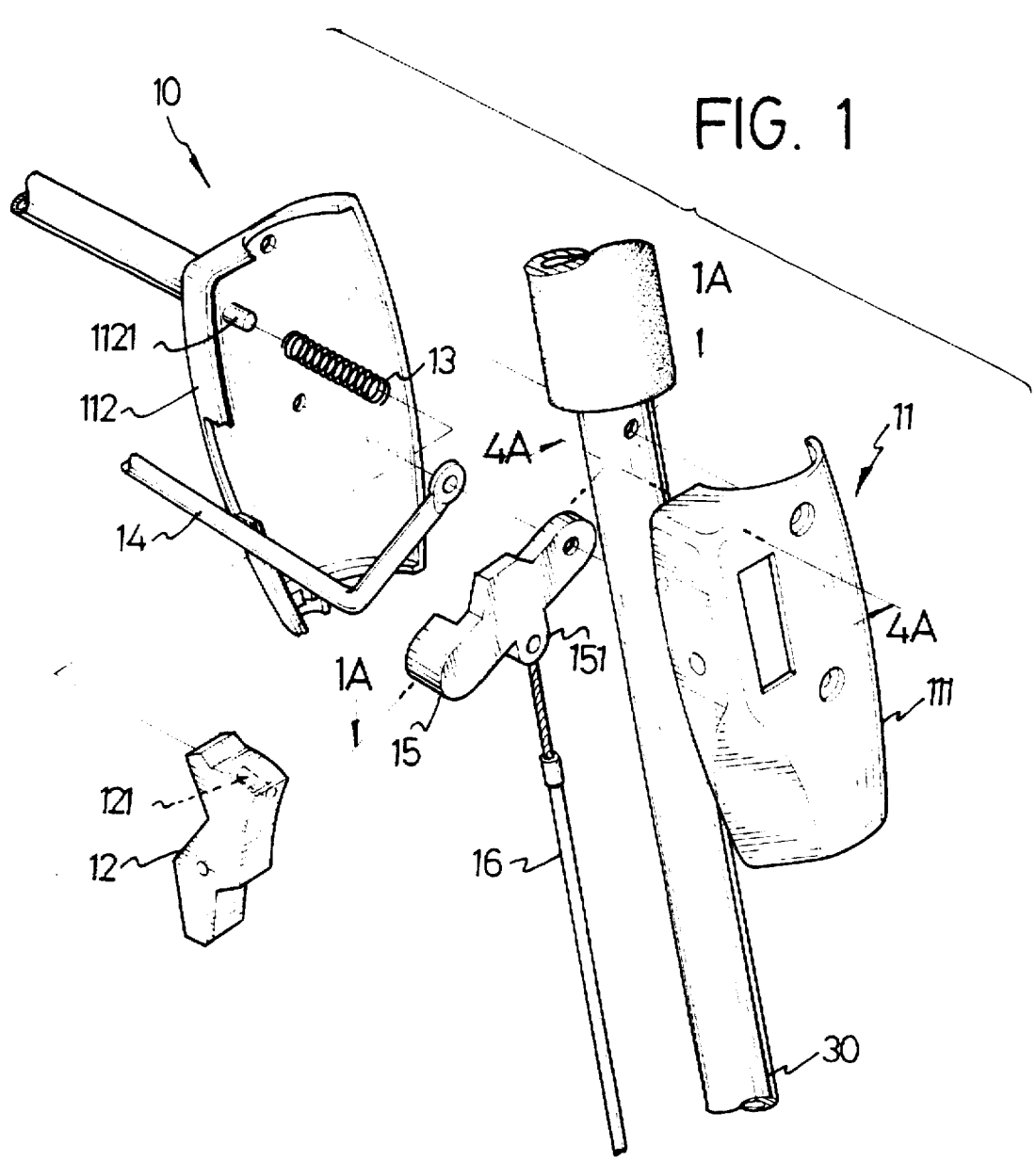
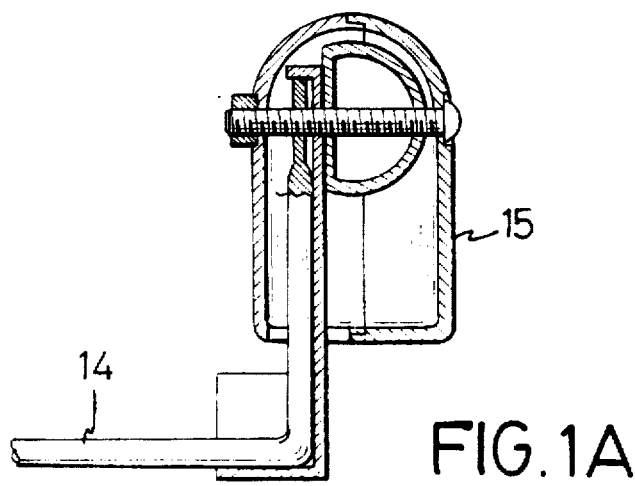

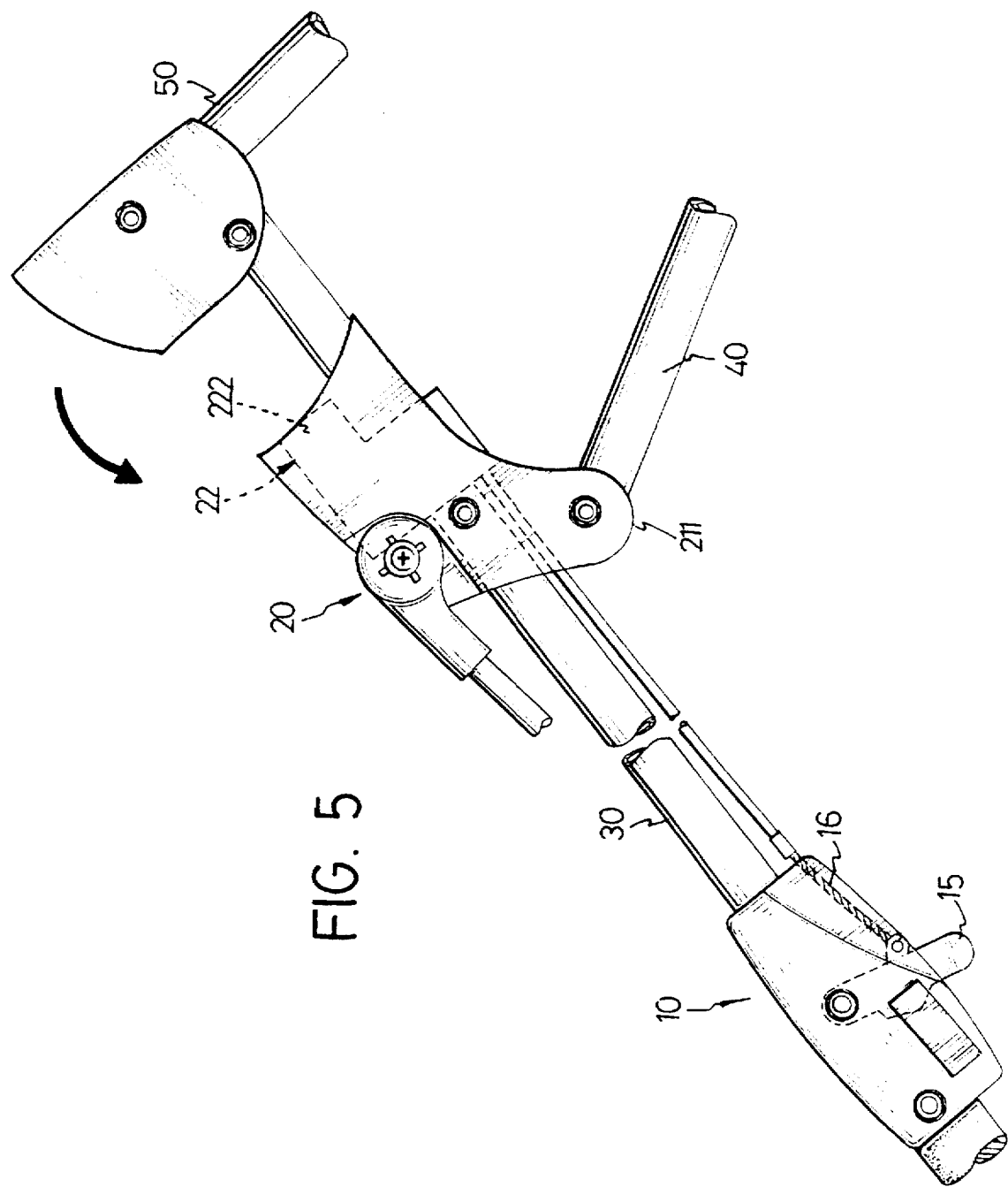

FOLDING ASSEMBLY FOR A TROLLEY

FIELD OF THE INVENTION

The present invention generally relates to a trolley folding assembly, and more particularly to a folding assembly which can be folded with ease.

BACKGROUND OF THE INVENTION

Most people have experience using a trolley for the convenience of carrying different things or even a baby. Carrying things or even a baby is a hard job especially when walking a long distance is necessary. Therefore using a trolley as a carrier to carry things instead of using arms to hold things has become very popular around the world. Even though a trolley really reduces the burden of people, it also brings an inevitable problem to people especially when a trolley is not needed anymore. This so called "inevitable problem" is that: when a person is holding something or a baby in his/her arms, it would be very difficult for that person to spare a free hand to fold a trolley. That is to say, the trolleys of the prior art do not include a mechanism which enables a person to disassemble or extend the trolley with only one hand. Rather, the trolleys of the prior art often need both hands to disassemble (fold) the whole structure, and in that case, a person holding a baby in arms will not be able to fold a trolley unless he/she gets help from others.

The present invention provides an improved trolley having an easy operating mechanism to mitigate and/or obviate the aforementioned problems.

SUMMARY OF THE INVENTION

The main objective of the invention is to provide a trolley folding assembly which can be operated with only one hand. The folding assembly comprises a driving device and a driven device. The driving device includes a cover, a safety switch, a spring, a driving rod, a link and a cable. The cover has an outer shell and an inner shell and the safety switch, which is biased to the inner shell by a spring, is sized and configured to be received within the outer cover. Because the driving rod is configured to be received within the link, pulling the driving rod will make the link pivot and the driven device will then undergo a series of movements, permitting folding of the trolley.

Another objective of the present invention is to provide a trolley folding assembly which reduces its volume greatly when folded.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the accompanying drawings wherein;

FIG. 1 is an exploded view of a driving device constructed in accordance with the invention;

FIG. 1A is a sectional view taken along A—A of FIG. 1;

FIG. 5 is a cross-sectional view taken along 3—3 of FIG. 2 of an embodiment showing an opened state of the retaining seat of FIG. 1.

DETAILED DESCRIPTION OF THE PREFERRED EMBODIMENT

Figure 2:
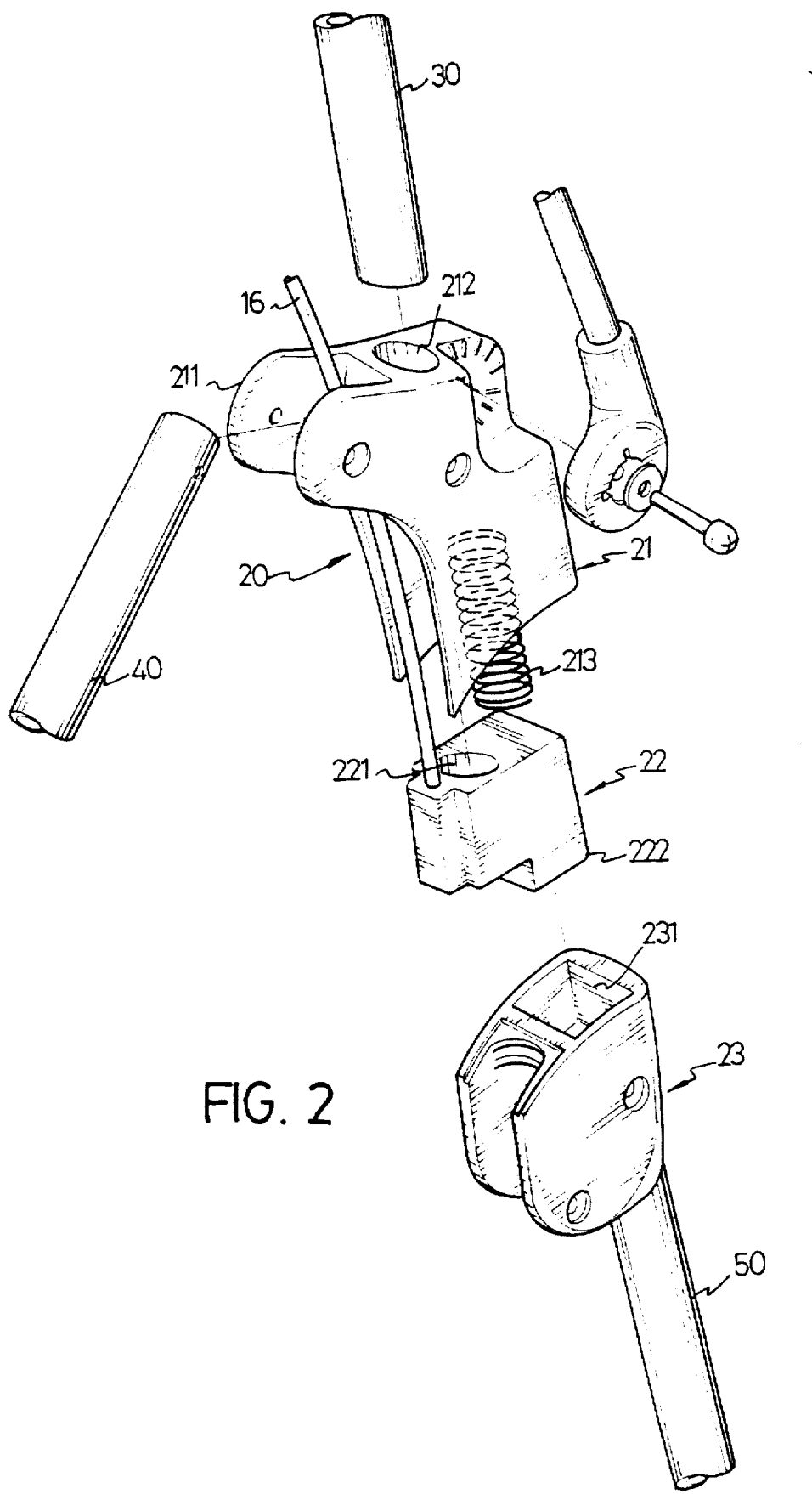
FIG. 2 is an exploded view of a driven device constructed in accordance with the invention.

Referring to the drawings and particularly FIGS. 1 and 2, a trolley folding assembly comprises a driving device 10 and a driven device 20. The driving device 10 includes a cover 11, a safety switch 12, a spring 13, a driving rod 14, a link 15 and a cable 16. The cover 11 comprises an outer shell 111 and an inner shell 112 and the safety switch 12, which is biased to the outer shell 111 by the spring 13, the latter being stably secured between a projection 1121 on the inner shell 112 and a protrusion 121 of the safety switch 12. Both the outer shell 111 and the inner shell 112 have an arcuate upper end which is configured to securely receive a supporting rod 30 in holes provided in each and a screw (not shown). The lower ends of both the outer shell and inner shell 111, 112 are respectively configured to permit movement of the driving rod 14, the link 15 and the cable 16 while the driving rod 14 is pulled by hand. The spring 13 is mounted around the projection 1121 which corresponds to the protrusion 121 provided on an inner surface of the safety switch 12. The link 15 is provided to have a hollow 151 to receive the cable 16 therein and a space (not labeled) for receiving the driving rod 14. The outer shell 111, the supporting rod 30, the link 15, the driving rod 14, and the inner shell 112 are respectively provided with a through hole for being assembled by a first screw (not shown) to extend therethrough onto the supporting rod 30. As can be seen from FIG. 1A, the driving rod 14 is received and stably secured within the link 15 by a second screw (not labeled).

Referring now to FIG. 2, the driven device 20 comprises a connecting seat 21, a block 22 and a receiving seat 23. The connecting seat 21 is provided with two arc-shaped seats 211 which are spaced apart and thus define a gap therebetween and through which the cable 16 extends downwardly from the driving device 10. The arc shaped seats 211 pivotally receive a first support 40. A passage 212 extends from an upper face of the connecting seat 21 to a bottom face thereof for receiving the supporting rod 30 which, after being inserted therethrough continuously connects with the block 22 by being further inserted into a second passage 221 provided in the block 22. The cable 16, after being received in the gap defined by the two arc-shaped seats 211, is firmly secured at a bottom face of the block 22. One end of a resilient member 213 is received in a space provided within the connecting seat 21 and the other end abuts against an upper face of the block 22. As to the block 22, there is an extending portion 222 projecting downwardly from the body of the block 22 for being received in a recess 231 provided on an upper face of the receiving seat 23. An opening (not labeled) is provided within the receiving seat 23 for receiving the supporting rod 30 which is secured to the receiving seat 23 by means of a rivet, etc.

Figure 3:
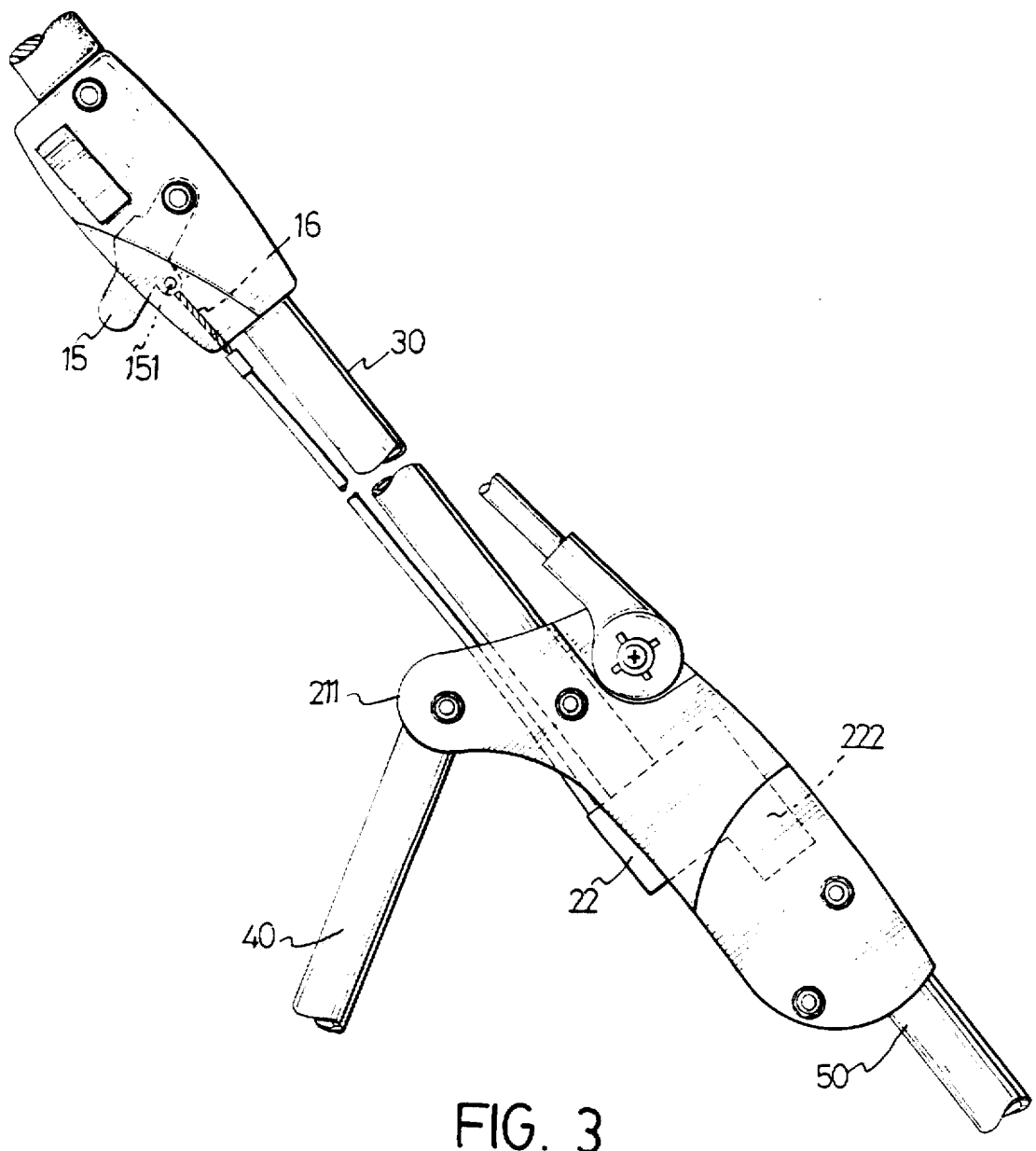
FIG. 3 is a plan view of a driving device and a driven device with a cable connected therebetween.
Figure 4:
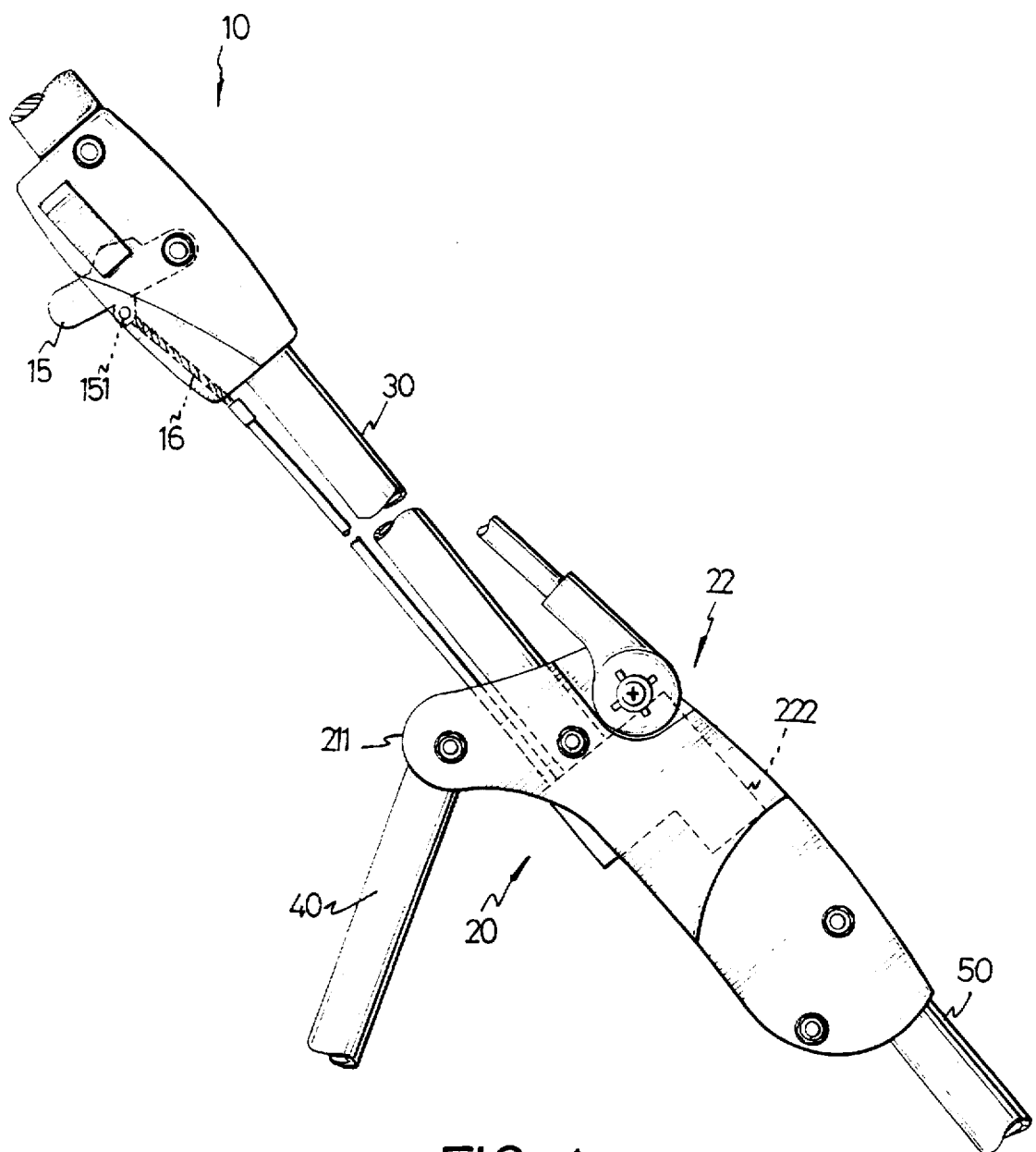
FIG. 4 is another plan view of the invention showing one member of the driven device moved according to the movement of a link.
Figure 4A:
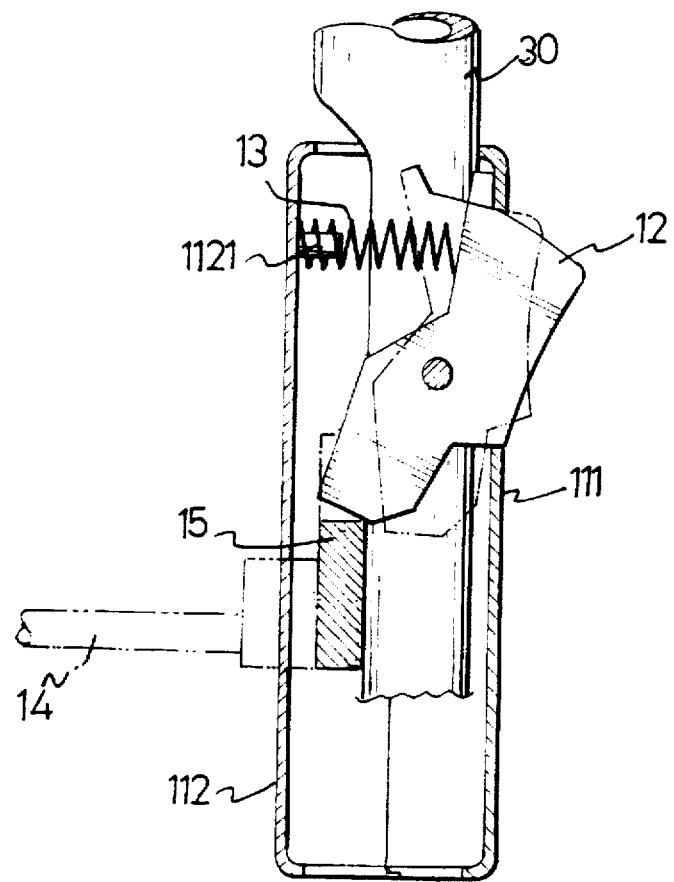
FIG. 4A is a plan view showing the corresponding position of the safety switch and the link.

Referring to FIG. 3, which is a plan view of the driving device 10 and the driven device 20 with the cable 16 connected therebetween, it is noted that, when the trolley is in use, the extending portion 222 of the block 22 rests in the recess 231 of the receiving seat 23, therefore constructing a firm and stable construction between the driving device 10 and the driven device 20. It is also noted that, a second support 50 is pivotally connected to the receiving seat 23.

It is seen from the accompanying drawings of 4 and 4A, that the link 15 is stopped by the pivotally connected safety switch 12, owing to the biasing force of the spring 13 acting onto the safety switch 12. Thus it is necessary to release the safety switch 12 before pulling the link 15, such that, the link 15 then has a clearance to move. After pressing the safety switch 12, the link 15 can only be pulled in a certain desired direction, and movement of the link 15 will simultaneously move the cable 16 to the direction as shown by the arrow. Because the cable 16 is stably secured at the bottom of the block 22, the movement of the cable 16 in the direction of the arrow will also move the block 22 in the same direction and eventually the extending portion 222 of the block 22 will leave the recess 231 of the receiving seat 23.

After the aforementioned movement is completed, and the extending portion 222 of the block 22 leaves the recess 231 of the receiving seat 23, a second support 50 pivotally connected to the driven device 20 of the folding assembly is able to be separated from the supporting rod, as shown in FIG. 5.

Figure 6:
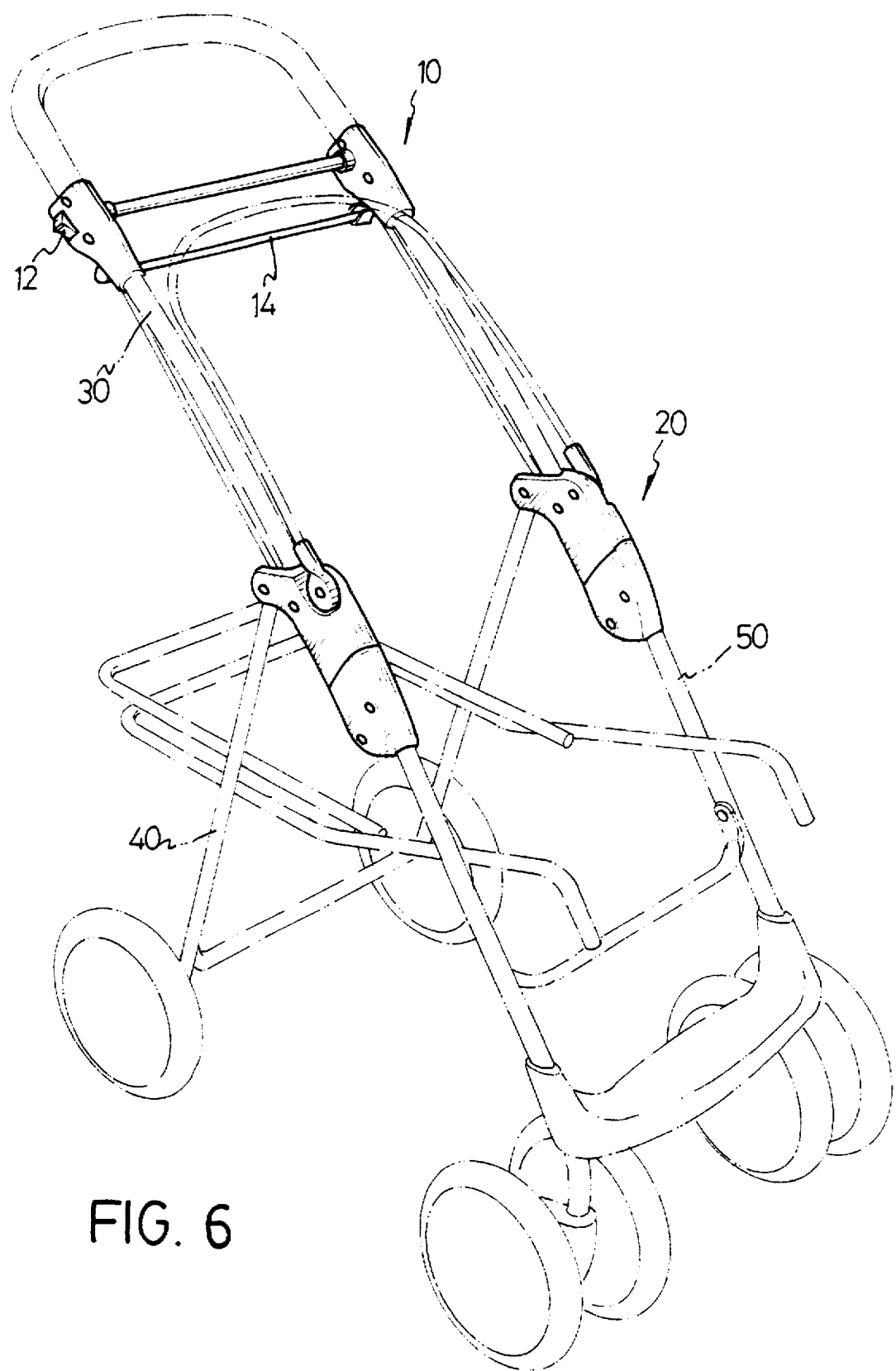
FIG. 6 is a preferred embodiment of the present invention.

From the preferred embodiment of the present invention of FIG. 6, it is seen that, because the driving rod 14 controls both sides of a trolley through the connection of the cable 16 with respect to the driven device 20 of both sides, the movement of the driving rod 14 will jointly move the block 22 and the extending portion 222 of the block 22 will eventually leave the recess 231 of the receiving seat 23, then the trolley is ready to be folded.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:
1. A folding assembly for a trolley comprising:
a driving device having:
  a cover provided with an inner shell and an outer shell securely connected with said inner shell and having an extension integrally formed therein;
  a supporting rod securely received between said inner shell and said outer shell;
  a safety switch pivotally received within said cover and having a protrusion integrally formed therein;
  a link pivotally received within said cover and securely connected with said safety switch;
  a cable having a first end securely attached to said link;
  a driving rod pivotally received within said cover and securely connected with said link; and
  a spring securely received between said protrusion of said safety switch and said extension of said outer shell, and
a driven device having:
  a connecting seat having defined therein a first hole through which said supporting rod is securely received;
  a resilient member securely received within said connecting seat;
  a receiving seat having defined therein a second hole through which second support is received, a recess and an opening in which a distal end of said supporting rod is received; and
  a block securely abutted by an end of said resilient member and securely engaged with a second end of said cable and having an extending portion formed therewith and movably received within said recess of said receiving seat.

2. The folding assembly for a trolley as claimed in claim 1, wherein said safety switch as firmly attached to said driving rod by the biasing force of said spring.

3. The folding assembly for a trolley as claimed in claim 1, wherein one end of said supporting rod is securely connected to said cover, and the other end is pivotally connected to said receiving seat.

* * * * *